United States Patent
Schaedler et al.

(10) Patent No.: US 8,136,613 B2
(45) Date of Patent: Mar. 20, 2012

(54) VEHICLE CONTROL SYSTEMS AND METHODS

(75) Inventors: Axel Schaedler, Olmsted Township, OH (US); Tim Dilgard, Ashland, OH (US)

(73) Assignee: MTD Products Inc, Valley City, OH (US)

( * ) Notice: Subject to any disclaimer, the term of this patent is extended or adjusted under 35 U.S.C. 154(b) by 922 days.

(21) Appl. No.: 12/055,668

(22) Filed: Mar. 26, 2008

(65) Prior Publication Data

US 2009/0241708 A1    Oct. 1, 2009

(51) Int. Cl.
*B60K 17/30* (2006.01)

(52) U.S. Cl. ............... 180/6.24; 180/6.62; 180/6.32; 180/6.28

(58) Field of Classification Search ........... 180/6.62, 180/6.24, 6.32, 6.28
See application file for complete search history.

(56) References Cited

U.S. PATENT DOCUMENTS

| | | | |
|---|---|---|---|
| 3,362,493 A | 1/1968 | Davis et al. | 180/6.32 |
| 3,398,819 A | 8/1968 | Ruhl et al. | 192/221 |
| 3,429,392 A | 2/1969 | Ryskamp | 180/6.3 |
| 3,572,033 A | 3/1971 | Tolley | 60/427 |
| 3,581,682 A | 6/1971 | Kontranowski | 180/55 |
| 3,865,208 A | 2/1975 | Crawshay et al. | 180/6.48 |
| 3,900,075 A | 8/1975 | Chichester et al. | 180/6.3 |
| 3,913,695 A | 10/1975 | Holdenried et al. | 180/6.48 |
| 4,339,966 A | 7/1982 | Kraus | 74/650 |
| 4,399,882 A | 8/1983 | O'Neill et al. | 180/6.48 |
| 4,572,310 A | 2/1986 | Peter | 180/6.24 |
| 4,875,536 A | 10/1989 | Saur et al. | 180/6.32 |
| 4,882,947 A | 11/1989 | Barnard | 475/23 |
| 4,969,533 A | 11/1990 | Holm et al. | 180/273 |
| 5,042,238 A | 8/1991 | White, III et al. | 56/11.8 |
| 5,078,222 A | 1/1992 | Hauser | 180/6.48 |
| RE34,057 E | 9/1992 | Middlesworth | 180/6.2 |
| 5,238,267 A | 8/1993 | Hutchison et al. | 280/781 |
| 5,263,901 A | 11/1993 | Kawakami et al. | 180/6.48 |
| 5,288,091 A | 2/1994 | Deschamps | 180/309 |
| 5,529,135 A | 6/1996 | Wenzel et al. | 180/6.24 |
| 5,766,105 A | 6/1998 | Fellows et al. | 474/18 |
| 5,850,886 A * | 12/1998 | Kouno et al. | 180/6.24 |
| 5,941,334 A | 8/1999 | Inagaki et al. | 180/242 |
| 6,092,617 A | 7/2000 | White, III et al. | 180/338 |
| 6,129,164 A | 10/2000 | Teal et al. | 180/6.2 |
| 6,152,248 A | 11/2000 | Hidaka et al. | 180/6.38 |
| 6,196,342 B1 | 3/2001 | Teal et al. | 180/6.2 |
| 6,230,829 B1 | 5/2001 | Martin et al. | 180/6.3 |
| 6,256,357 B1 | 7/2001 | Oshima | 375/261 |

(Continued)

FOREIGN PATENT DOCUMENTS

EP    0 754 613    1/1997

(Continued)

OTHER PUBLICATIONS

"SST15, SST16, and SST18 Spin-Steer Technology™ lawn tractors," Litho in U.S.A., Apr. 2003.

Hidaka, "Development of forced differential steering control system," *Automation Technology for Off-Road Equipment, Proceeding of the Oct. 7-8, 2001 Conference*, Kyoto, Japan, Oct. 7, 2004.

(Continued)

*Primary Examiner* — Paul N Dickson
*Assistant Examiner* — Marlon Arce
(74) *Attorney, Agent, or Firm* — Fulbright & Jaworski LLP

(57) ABSTRACT

Systems for controlling the speed and direction of vehicles such as tractors, including vehicles that have low to zero turning radius capability. Systems include steering and speed coordination systems that control the direction and speed of rotation of vehicle drive units.

31 Claims, 14 Drawing Sheets

U.S. PATENT DOCUMENTS

| | | |
|---|---|---|
| 6,257,357 B1 | 7/2001 | Teal et al. ............... 180/6.2 |
| 6,301,864 B1 | 10/2001 | Damie et al. ............ 56/11.3 |
| 6,408,960 B1 | 6/2002 | Hidaka et al. ........... 180/6.38 |
| 6,434,919 B2 | 8/2002 | Schick ..................... 56/15.9 |
| 6,447,419 B1 | 9/2002 | Irikura et al. ............ 475/24 |
| 6,456,925 B1 | 9/2002 | Romig ..................... 701/93 |
| 6,540,633 B1 | 4/2003 | Hasegawa et al. ........ 475/24 |
| 6,554,085 B2 | 4/2003 | Hasegawa et al. ....... 180/6.26 |
| 6,601,663 B2 | 8/2003 | Hauser ..................... 180/6.3 |
| 6,672,411 B1 | 1/2004 | Mouser ..................... 180/6.32 |
| 6,688,090 B2 | 2/2004 | Velke et al. ............... 56/14.7 |
| 6,725,954 B1 | 4/2004 | Keane et al. ............. 180/6.48 |
| 6,729,115 B2 | 5/2004 | Bartel ..................... 56/11.3 |
| 6,771,034 B2 | 8/2004 | Reile et al. .............. 318/139 |
| 6,808,032 B2 | 10/2004 | Wuertz et al. ............ 180/6.48 |
| 6,874,305 B2 | 4/2005 | Ishimori ................. 56/10.8 |
| 6,904,985 B2* | 6/2005 | Ferree et al. ............. 180/6.32 |
| 6,905,985 B1 | 6/2005 | Schindzielorz et al. ....... 442/65 |
| 6,912,831 B2 | 7/2005 | Velke et al. ............... 56/10.9 |
| 6,921,109 B2 | 7/2005 | Hutchison et al. ........... 280/771 |
| 6,951,259 B2 | 10/2005 | Irikura .................... 180/6.3 |
| 6,962,219 B2 | 11/2005 | Hauser ..................... 180/6.34 |
| 7,017,327 B2 | 3/2006 | Hunt et al. ............... 56/14.7 |
| 7,108,096 B1* | 9/2006 | Oxley et al. ............. 180/197 |
| 7,237,629 B1 | 7/2007 | Bland et al. ............. 180/6.24 |
| 7,347,434 B2* | 3/2008 | Lewis et al. .............. 280/99 |
| 7,914,022 B2* | 3/2011 | Ruebusch et al. ........ 280/93.502 |
| 2002/0092685 A1 | 7/2002 | Hauser ..................... 180/6.3 |
| 2002/0108800 A1 | 8/2002 | Irikura et al. ............ 180/307 |
| 2003/0019682 A1 | 1/2003 | Schaedler et al. ......... 180/308 |
| 2003/0102171 A1 | 6/2003 | Hauser ..................... 180/6.2 |
| 2003/0106725 A1 | 6/2003 | Irikura ..................... 180/6.26 |
| 2003/0213625 A1 | 11/2003 | Okada et al. ............. 180/6.2 |
| 2004/0245029 A1 | 12/2004 | Irikura ..................... 180/6.24 |
| 2005/0003919 A1 | 1/2005 | Hasegawa et al. ........ 475/83 |
| 2005/0023049 A1 | 2/2005 | Ferree et al. ............. 180/6.3 |
| 2005/0145421 A1* | 7/2005 | Ishimori ................. 180/6.32 |
| 2006/0278446 A1 | 12/2006 | Oxley et al. ............. 180/6.24 |
| 2007/0144796 A1 | 6/2007 | Schaedler et al. ......... 180/6.24 |
| 2008/0136134 A1 | 6/2008 | McCoid et al. ......... 280/93.502 |
| 2008/0184687 A1 | 8/2008 | Scherbring et al. ........... 56/10.1 |
| 2009/0188728 A1* | 7/2009 | Osborne ................... 180/6.24 |

FOREIGN PATENT DOCUMENTS

| | | |
|---|---|---|
| EP | 1 000 793 | 5/2000 |
| EP | 1 186 459 | 3/2002 |
| GB | 2 015 666 | 9/1979 |
| GB | 2 303 829 | 3/1997 |
| WO | WO 03/100295 | 12/2003 |
| WO | WO 2008/060169 | 5/2008 |

OTHER PUBLICATIONS

Office Communication issued in U.S. Appl. No. 11/490,881, dated Mar. 13, 2009.
Response to Office Communication issued in U.S. Appl. No. 11/490,881, submitted Apr. 13, 2009.
Office Communication issued in U.S. Appl. No. 11/490,881, dated Jul. 2, 2009.
Office Communication issued in U.S. Appl. No. 11/269,899, dated Feb. 6, 2007.
Response to Feb. 6, 2007 Office Communication, U.S. Appl. No. 11/269,899, submitted Aug. 6, 2007.
Office Communication issued in U.S. Appl. No. 11/269,899, dated Nov. 19, 2007.
Response to Nov. 19, 2007 Office Communication, U.S. Appl. No. 11/269,899, submitted Dec. 19, 2007.
Office Communication issued in U.S. Appl. No. 11/269,899, dated Apr. 1, 2009.
European Office Communication issued in Application No. 06 792 907.5-1264, dated Feb. 2, 2009.
European Office Communication issued in Application No. 06 792 905.9-1264, dated Mar. 13, 2009.
Supplementary European Search Report, issued in Int. App. No. EP 06 78 8098, mailed Jul. 14, 2009.
New Zealand Examination Report, issued in Int. App. No. 566486, mailed Sep. 29, 2009.
Response to Jul. 2, 2009 Office Action, submitted in U.S. Appl. No. 11/490,881, dated Sep. 24, 2009.
Response to Apr. 1, 2009 Office Action, submitted in U.S. Appl. No. 11/269,899, dated Oct. 1, 2009.
International Search Report and Written Opinion, issued in Application No. PCT/US2009/038404, mailed Jan. 8, 2010.
New Zealand Examination Report, issued in Application No. 566485, mailed Sep. 24, 2009.
European Office Action, issued in European Application No. 06788098.9, mailed Oct. 12, 2009.
International Search Report and Written Opinion, issued in Application No. PCT/US2006/28357, mailed Aug. 8, 2007.
Office Action, in U.S. Appl. No. 11/490,881, mailed Feb. 19, 2010.
Response to Office Action, in European App. No. 06792907.5, dated Aug. 27, 2009.
Response to Office Action, in European App. No. 06792905.9, dated Oct. 30, 2009.
Extended European Search Report issued in European Patent Application No. EP 09763018, dated Dec. 1, 2011.

\* cited by examiner

VEHICLE CONTROL SYSTEMS AND METHODS

BACKGROUND

Embodiments of the invention relate generally to vehicles that have low to zero turning radius capability. In the art, zero turning radius vehicles are often described as ZTR vehicles, although this name has also been used to described vehicles capable of a turning radius that is not precisely zero. More specifically, embodiments of the invention relate to steering systems for such vehicles, to steering and speed coordination systems for such vehicles, and to vehicles that comprises one or both types of systems.

SUMMARY

Some embodiments of the present vehicle control system comprise: a steering input member; a first control member operatively engaged with the steering input member; a first steering link coupled to the first control member and to a steering system for a first steered wheel; and a first integration link coupled to the first control member and to a control system for a first drive unit. Certain embodiments may also comprise: a second control member operatively engaged with the steering input member; a second steering link coupled to the second control member and to a steering system for a second steered wheel; and a second integration link coupled to the second control member and to a control system for a second drive unit. In specific embodiments, the first drive unit may be a first hydrostatic transmission and the second drive unit may be a second hydrostatic transmission.

In particular embodiments, the first control member and the second control member are laterally oriented. The first and second integration links may each includes a slot, and the slot may be straight in certain embodiments. Certain embodiments may also comprise a first coupling member coupling the first integration link to the first control member, and a second coupling member coupling the second integration link to the second control member, where the first coupling member engages the slot of the first integration link and the second coupling member engages the slot of the second integration link.

In certain embodiments, the first integration link may be directly coupled to the first control member via the first coupling member and the second integration link may be directly coupled to the second control member via the second coupling member. In particular embodiments, the first and second control members can be configured to rotate in the same plane in response to a rotation of the steering input member. In specific embodiments, the steering input member may be located between the first and second control members. Particular embodiments may further include a first speed input member and a first speed input coupling member that couples the first integration link to the first speed input member. In specific embodiments, the speed input member may include a slot, and the first speed input coupling member may translate across the slot as the steering input member rotates. Certain embodiments may also include a first speed input coupling member that couples the first integration link to the first speed input member.

Some embodiments of the present vehicle control systems comprise: a steering input member; a first control member operatively engaged with the steering input member; a first steering link coupled to the first control member and to a steering system for a first steered wheel; a first speed input member coupled to a speed control device; and a first integration link coupling the first control member to the first speed input member. In certain embodiments, the first integration link may also be coupled to a control mechanism for a first drive unit, and the vehicle control system being may be configured such that a steering input received through the steering input member is transferred through the steering input member to the first control member. In certain embodiments, the steering input may then be transferred through the first control member to the steering system and through the first integration link to the first speed input member, which can then transfer a speed input received from the speed control device through the first integration link and to the first drive unit as a driving and steering signal.

Certain embodiments may also comprise: a second control member operatively engaged with the steering input member and a second steering link coupled to the second control member and to a steering system for a second steered wheel. Particular embodiments may also comprise a second speed input member coupled to the speed control device and a second integration link coupling the second control member to the second speed input member. In specific embodiments, the second integration link may also be coupled to a control mechanism for a second drive unit. In particular embodiments, the vehicle control system may be configured such that a steering input received through the steering input member is transferred through the steering input member to the second control member, then through the second control member to the steering system for the second steered wheel and through the second integration link to the second speed input member, which can then transfer a speed input received from the speed control device through the second integration link and to the second drive unit as a driving and steering signal.

In specific embodiments, a manipulation of the steering input member while the speed control device is in a neutral position will not result in a change in the speed input. In the first drive unit is a first hydrostatic transmission and the second drive unit is a second hydrostatic transmission. Particular embodiments may also include a first coupling member coupling the first integration link to the first control member, and a second coupling member coupling the second integration link to the second control member, where the first coupling member engages the slot of the first integration link and the second coupling member engages the slot of the second integration link.

In certain embodiments, the first integration link is directly coupled to the first control member via the first coupling member and the second integration link is directly coupled to the second control member via the second coupling member. In particular embodiments, the first and second integration links each includes a slot. In specific embodiments, the slot in the first second integration link is straight and the slot in the second integration link is straight.

In particular embodiments, the first and second control members are configured to rotate in the same plane in response to a rotation of the steering input member. In certain embodiments, the steering input member may be located between the first and second control members. In specific embodiments, the first and second speed input members each include a slot. In certain embodiments, the first speed input coupling member may translate across the slot as the steering input member rotates.

Some embodiments of the present vehicle control systems comprise: a pair of integration links, where each integration link has a slot that is straight over substantially all of the length of the slot and each integration is configured to lie in a plane parallel to any flat surface on which a vehicle that incorporates the steering control system is used, and each integration link is configured to transmit a drive signal that is a product of any received steering input and any received speed input.

Certain embodiments comprise: a first speed input member configured to pivot about a first axis; a second speed input member configured to pivot about a second axis; a first control member configured to pivot about a third axis; and a second control member configured to pivot about a fourth axis, where the first, second, third and fourth axes are parallel to each other and are normal to any flat surface on which a vehicle that incorporates the steering control system is used.

Any embodiment of any of the present systems may consist of or consist essentially of—rather than comprise/include/contain/have—the described features. Thus, in any of the claims, the term "consisting of" or "consisting essentially of" may be substituted for any of the open-ended linking verbs recited above, in order to change the scope of a given claim from what it would otherwise be using the open-ended linking verb.

Details associated with these embodiments and others are provided below.

BRIEF DESCRIPTION OF THE DRAWINGS

The following drawings illustrate by way of example and not limitation. Identical reference numerals do not necessarily indicate an identical structure. Rather, the same reference numeral may be used to indicate a similar feature or a feature with similar functionality. Every feature of each embodiment is not always labeled in every figure in which that embodiment appears, in order to keep the figures clear. At least

FIG. 2 is a perspective view of the chassis and control and steering assemblies of the vehicle of FIG. 1;

FIG. 3 is a partial perspective view of the control and steering assemblies of the vehicle of FIG. 1;

FIG. 4 is a partial exploded view of the control and steering assemblies of the vehicle of FIG. 1;

FIG. 5 illustrates a top view of the control and steering assemblies of the vehicle of FIG. 1 with a neutral steering input and a neutral speed input;

FIG. 6 illustrates a top view of the control and steering assemblies of the vehicle of FIG. 1 with a left turn steering input and a neutral speed input;

FIG. 7 illustrates a top view of the control and steering assemblies of the vehicle of FIG. 1 with a right turn steering input and a neutral speed input;

FIG. 8 illustrates a top view of the control and steering assemblies of the vehicle of FIG. 1 with a neutral steering input and a forward speed input;

FIG. 9 illustrates a top view of the control and steering assemblies of the vehicle of FIG. 1 with a left turn steering input and a forward speed input;

FIG. 10 illustrates a top view of the control and steering assemblies of the vehicle of FIG. 1 with a right turn steering input and a forward speed input;

FIG. 11 illustrates a top view of the control and steering assemblies of the vehicle of FIG. 1 with a neutral steering input and a reverse speed input;

FIG. 12 illustrates a top view of the control and steering assemblies of the vehicle of FIG. 1 with a left turn steering input and a reverse speed input;

FIG. 13 illustrates a top view of the control and steering assemblies of the vehicle of FIG. 1 with a right turn steering input and a reverse speed input; and FIG. 14 illustrates a perspective view of a control mechanism for a drive unit of the vehicle of FIG. 1.

DETAILED DESCRIPTION OF ILLUSTRATIVE EMBODIMENTS

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. Thus, a vehicle that "comprises" a steering input member; a first control member operatively engaged with the steering input member; a first steering link coupled to the first control member and to a steering system for a first steered wheel; and a first integration link coupled to the first control member and to a control system for a first drive unit, is a vehicle that possesses the listed elements, but is not prohibited from possessing elements that are not listed (such as an additional steerable structure).

Likewise, an element of an apparatus that "comprises," "has," "contains" or "includes" one or more features possesses those one or more features, but is not limited to possessing only those one or more features. Furthermore, a structure that is configured in a certain way must be configured in at least that way, but also may be configured in a way or ways that are not specified.

The terms "a" and "an" are defined as one or more than one unless this disclosure explicitly requires otherwise. The terms "substantially" and "about" are defined as at least close to (and includes) a given value or state (preferably within 10% of, more preferably within 1% of, and most preferably within 0.1% of).

General Configuration

Figure 1:
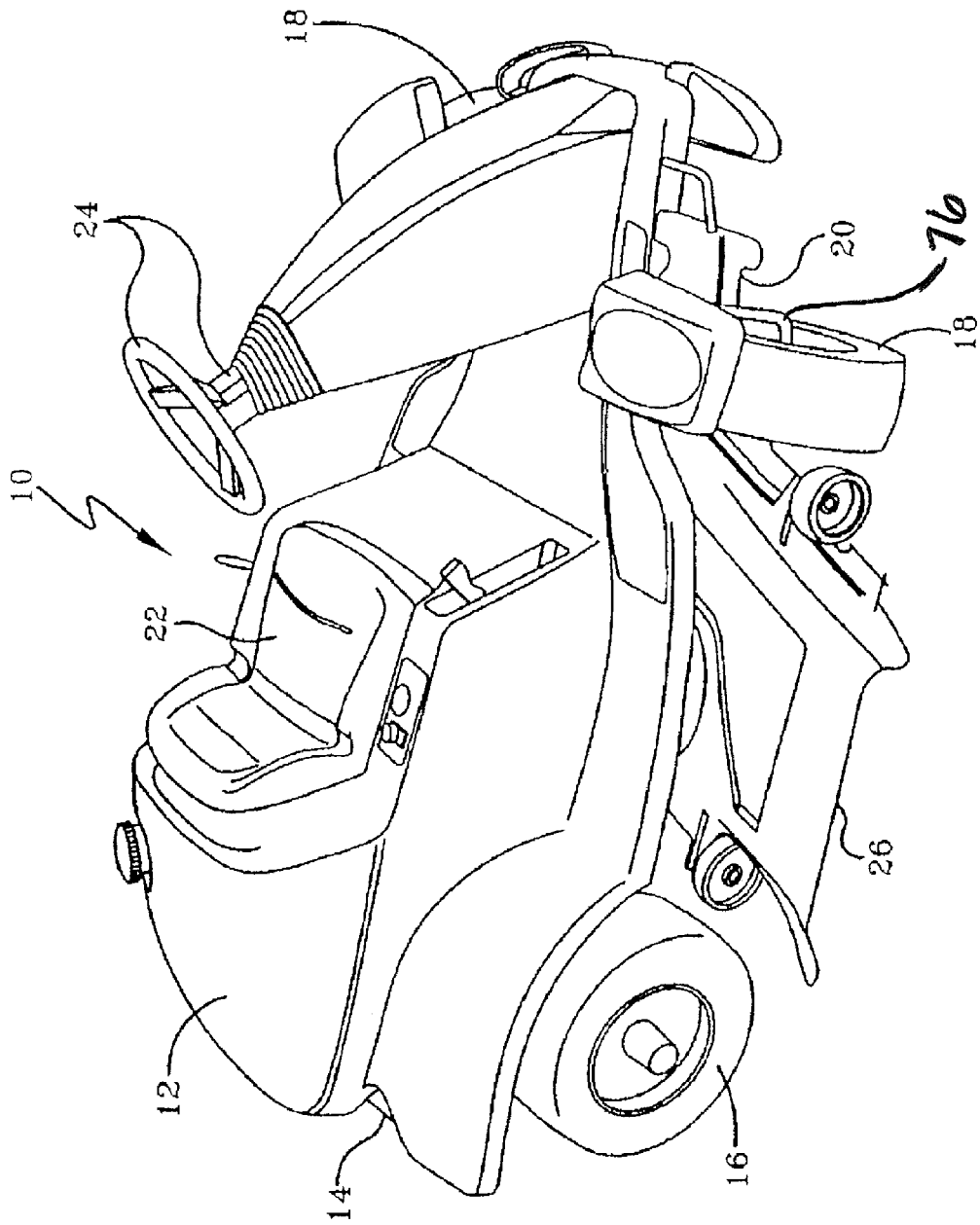
FIG. 1 is a perspective view of a lawn and garden type vehicle.

Referring now to the figures, FIG. 1 illustrates a vehicle 10, such as a lawn and garden tractor. The vehicle 10 includes a prime mover 12, such as an engine, that is mounted to a structural frame or frame 14. The vehicle 10 includes drive wheels 16, such as left and right rear drive wheels that are coupled to the frame 14. The drive wheels 16 are operatively coupled to the engine 12 through a transmission system to provide locomotion to the vehicle 10. The vehicle 10 also has steerable structures 18, such as right and left front ground-engaging wheels, which may be non-driving wheels. Other embodiments of the vehicles have only one steerable structure (e.g., three-wheeled all-terrain vehicles). Furthermore, in some embodiments, steerable structures such as skis may be used instead of wheels.

The frame 14 supports an operator station comprising a seat 22. Vehicle 10 also includes a mower deck 26 mounted to the vehicle 10 in any suitable manner. In some embodiments, the invention is applicable to other types of vehicles, including but not limited to utility vehicles, off road vehicles, tractors, golf carts, and even automobiles.

Figure 2:
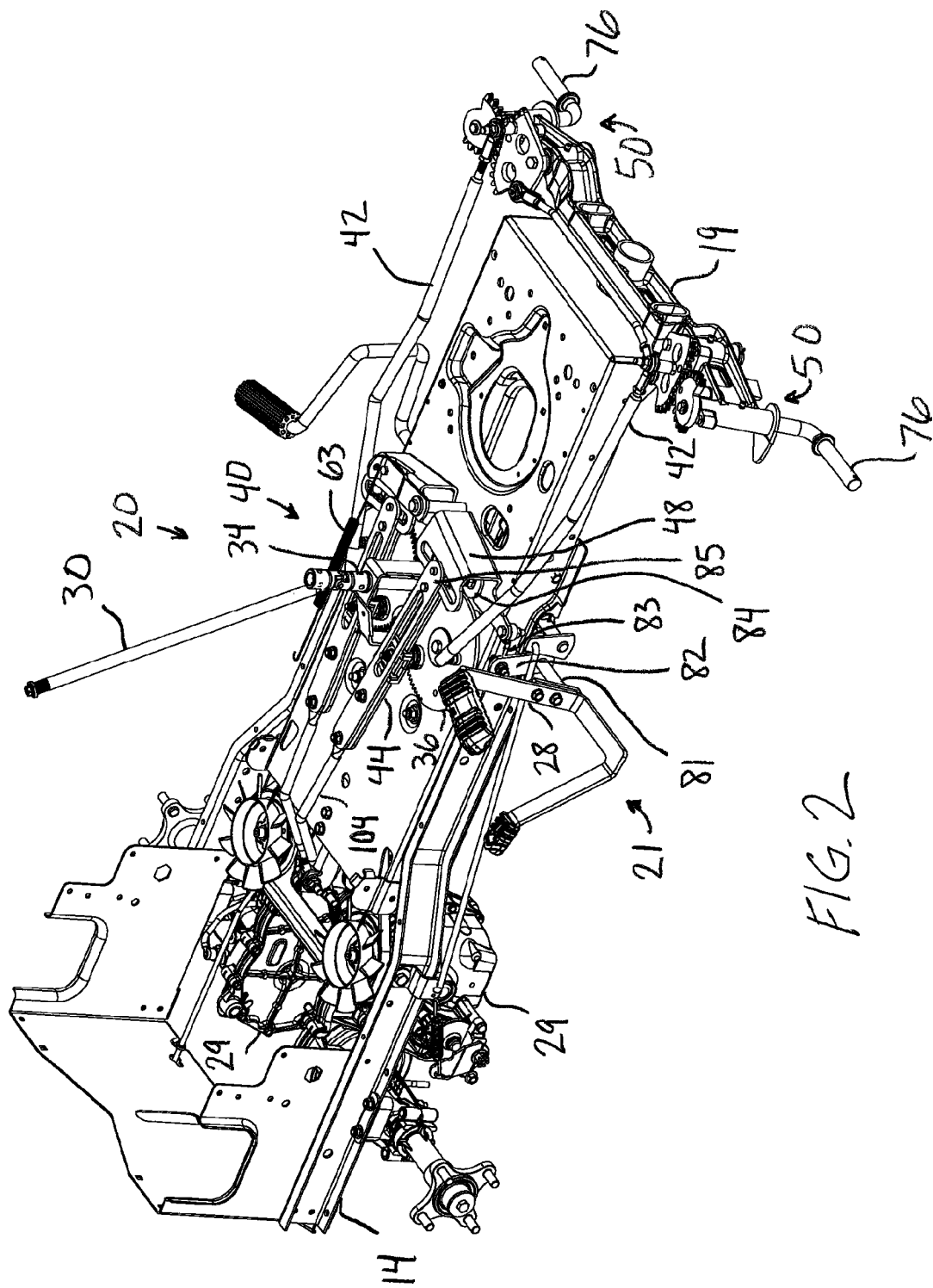
FIGS. 2-14 are drawn to scale, meaning the sizes of the depicted elements are accurate relative to each other for at least one set of embodiments of the present devices and systems.

As shown in FIGS. 1-2, the front wheels 18 are coupled to the frame of the vehicle through a pivotable connection to a front axle 19 mounted on the frame 14. The front wheels 18 are also coupled to a steering assembly 20, which is configured to control the direction they turn as discussed more fully below. In the embodiment of the present vehicles shown in the figures, the front wheels are the steerable wheels 18 and the rear wheels are the drive wheels 16. However, one skilled in the art will understand that the rear wheels may be the steerable wheels and the front wheels may be the drive wheels in other embodiments. Likewise, the front wheels may be both the steerable wheels and the drive wheels.

A steering input device 24 (which is part of the embodiment of the steering assembly 20 shown in the figures) and a speed control device 28 (which is part of the embodiment of the speed control assembly 21 discussed below) are located near the seat 22 (FIG. 1) so that they are accessible to the operator of the vehicle. An operator may apply a steering input to the steering input device 24, which transfers the steering input to the steering assembly 20. Steering input device 24 may take the form of a conventional steering wheel. However, the steering input device 24 may be another suitable steering device, including, but not limited to, a steering rod or joystick (not shown).

The speed control device 28 provides a speed input to the balance of the speed control assembly 21, and (at least in part) regulates the forward and reverse speed of the vehicle 10. Speed control device 28 may take the form of a single pedal, such as a treadle pedal arrangement mounted on a single shaft. In such an embodiment, the speed control device 28 is rocked forward to select forward drive, or rocked backward to select reverse drive. The speed control device 28 may be biased toward a central position that corresponds to a neutral or stationary condition.

Vehicle 10 also includes a control system 40 that is configured to integrate a steering input received by the steering assembly 20 via the steering input device 24 with a speed input received by the speed control assembly 21 (discussed below) via the speed control device 28 to drive and steer the vehicle 10. The configurations of the present steering assemblies, speed control assemblies and integration devices allow the vehicle to make small- to zero-radius turns.

The left and right drive wheels 16 are driven through a transmission system that, in the depicted embodiment, comprises left and right drive units 29. Vehicle 10 includes a speed control assembly 21 that controls the direction and magnitude of rotation of the rear drive wheels 16. The drive units 29 may be transmissions of the continuously variable type, capable of providing a continuous range of ratios from forward to reverse. Examples of a suitable transmission utilizing a ratio varying-device, or variation, in conjunction with an epicyclic shunt gear to provide a geared neutral facility is described in International Application PCT/GB03/00332, published under WO 03/064892, and International Application PCT/GB03/02332, published under WO 03/100295, both of which are incorporated by reference for those descriptions. Alternately, the drive units 29 may be hydrostatic transmissions (HST) or electric motors, both of which are well known in the art. The drive units 29 may be used to independently drive the drive wheels 16.

The driver dictates the speed and direction of the vehicle 10 by manipulating the steering input device 24 and the speed control device 28, which transmit the steering and speed inputs received from the driver to control system 40. The manner in which the steering and speed control assemblies work together through control system 40 to drive and steer the vehicle is described in more detail below. In the embodiment of vehicle 10 shown in the figures, the amount of torque that the rear drive wheels must produce to turn the vehicle 10 is reduced because front wheels 18 are steerable. In contrast, the drive wheels 16 of some conventional ZTR vehicles with non-steerable castor wheels must produce significant torque to cause the castor wheels to react and point in the desired direction. Furthermore, a certain amount of familiarity and skill is required to prevent skidding the inboard drive wheel and tearing the grass under the wheel.

In the embodiment of vehicle 10 shown in the figures, the right and left drive wheels 16 are coupled to frame 14 such that their direction is fixed and their rotational axes are in constant alignment. In contrast, the front steerable wheels 18 are coupled to the frame 14 in a way that gives them the ability to change direction. The use of a substantially-true Ackermann steering geometry (which can be achieved using some of the embodiments discussed below) can help to avoid scrubbing rubber from the tire tread on the outboard wheel or damaging vegetation under the front wheels.

Steering Assembly

Aspects of steering assembly 20 are depicted in, e.g., FIGS. 2-13. One function of the steering assembly 20 is to couple the steering input device 24 to the front steerable wheels 18 to aid in guiding vehicle 10. Another function of the steering assembly 20 is to provide a steering input to the control system 40, which can coordinate that steering input with a speed input received through speed control device 28. Another function of the steering assembly 20 is its ability to turn the vehicle 10, even in a zero turning radius mode (or a small turning radius mode), while receiving an input from a conventional steering input device such as a steering wheel.

In one embodiment, the steering assembly 20 includes a steering shaft 30 extending downwardly from the steering input device 24 and terminating in a steering input member 32. In certain exemplary embodiments steering input member 32 may be a pinion gear or other device suitable for imparting motion from the steering input device 24 to downstream components (as discussed more fully below). The steering shaft 30 is rotatably coupled to the frame 14 with a bushing 34 or any other suitable means. The steering shaft 30 and steering input member 32 take the steering input received through the steering input device 24 and take part in transmitting it to front wheel assemblies 50, which convert the steering input into desired steering angles of the front wheels 18, as explained below. In certain exemplary embodiments, front wheel assemblies 50 are configured to provide Ackermann steering so that the inner front wheel turns about a smaller radius than the outer front wheel.

In one embodiment, the coupling between the steering shaft 30 and the front wheel assemblies is accomplished using, in part, left and right control members 36. In certain exemplary embodiments, control members 36 have a toothed or geared surface on part of their outer circumference. In specific exemplary embodiments, control members 36 are laterally oriented so that they move in a plane generally horizontal or parallel to the ground below vehicle 10. The steering input member 32 is positioned between, and simultaneously engages, the left and right control members 36 such that rotation of the steering input member 32 causes simultaneous rotation of the left and right control members 36. In certain exemplary embodiments, the steering input device 24 and steering input member 32 may be rotated through about 120 degrees of movement. For example, the steering input device 24 may be selectively rotated 60 degrees in a first direction with respect to a neutral steering position and 60 degrees in a second direction. However, the steering input device 24 and steering input member 32 may be configured for rotation through any range of angles suited to a given application.

Rotating the steering input device 24 and steering input member 32 in a first direction causes one of the control members 36 to rotate clockwise and the other control member 36 to rotate counter-clockwise (when viewed from above vehicle 10). The left and right control members 36 are coupled to right and left steering links 42 and right and left integration links 44. In exemplary embodiments, both right and left steering links 42 and right and left integration links 44 are closely coupled to control members 36. In specific exemplary embodiments, the ends of steering links 42 that are closest to control members 36 are approximately 0.5 to 2.0 centimeters from control members 36 (shown as dimension B in FIG. 3). In certain embodiments, control system 40 can be configured so that steering link 42 is closely spaced to control member 36. Such a configuration may reduce a torque that steering link 42 can place on control member 36 during operation, which could tend to twist control member 36 out of the horizontal plane. In addition, steering link 42 may pass underneath integration link 44 in some positions (shown in FIG. 6, for example). Therefore, reducing the space between control member 36 and steering link 42 can reduce the distance needed between control member 36 and integration link 44.

In addition, integration links 44 are spaced approximately 1.0 to 3.0 centimeters from control members 36 (shown as dimension C in FIG. 3) in specific exemplary embodiments. The lateral orientation of components such as control members 36 and integration links 44 can reduce the amount of space that steering assembly 20 and control system 40 occupy. Preferably, the right and left sides of the steering assembly 20 are substantially identical but mirror images of each other.

Figure 5:
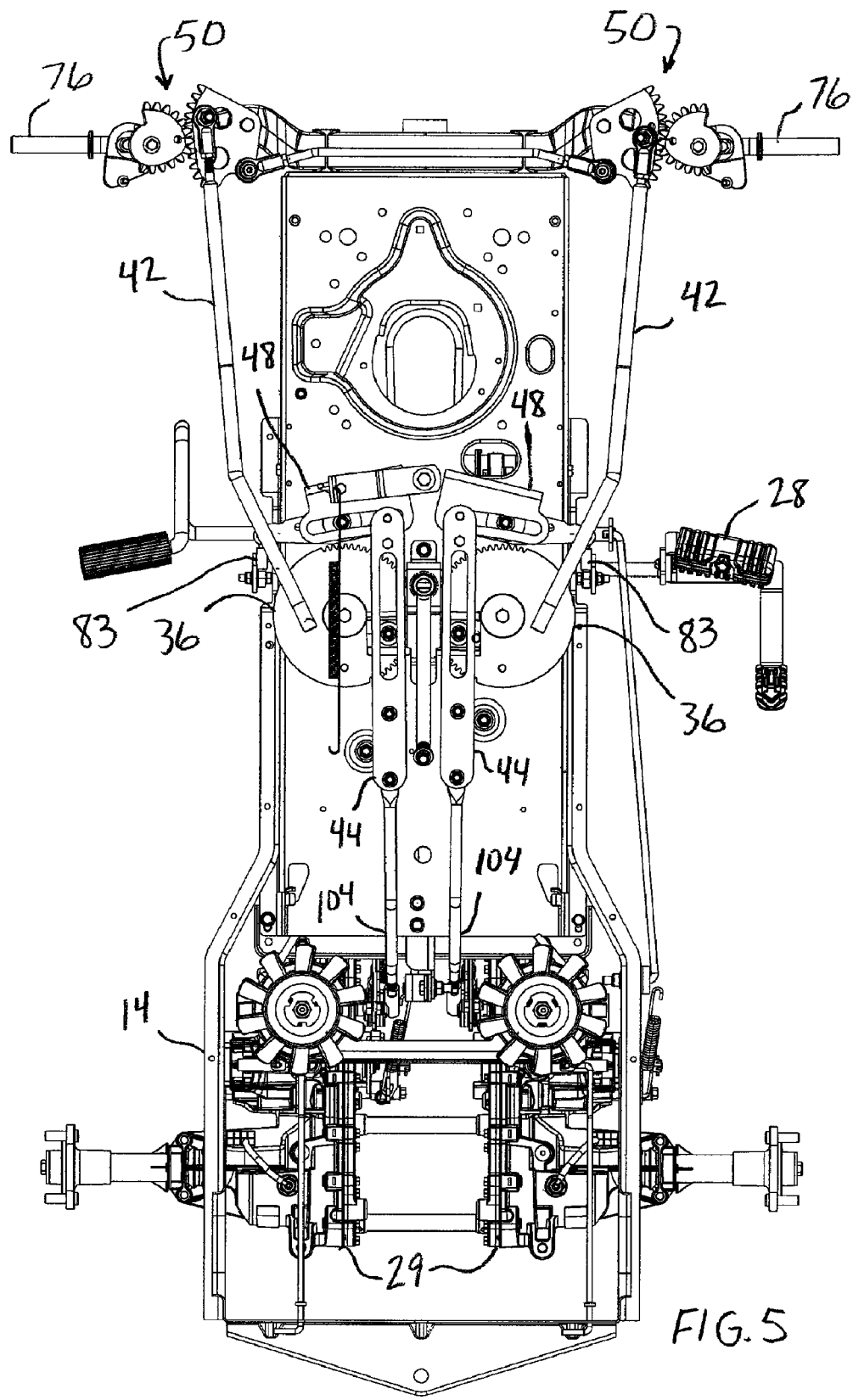

As control members 36 rotate, right and left steering links 42 are also shifted longitudinally (towards the front or back of vehicle 10) and laterally (towards one side of vehicle 10). As shown in FIG. 5, the ends of steering links 42 that are opposite of control members 36 are coupled to front wheel assemblies 50. Therefore, steering links 42 can be moved to manipulate front wheel assemblies 50

Speed Control Assembly

Referring now to FIG. 2, speed control assembly comprises speed control device 28 coupled to rod 81 and lever 82. As speed control device 28 is rotated forward or backward, so are rod 81 and lever 82, which is oriented perpendicular to rod 81. For purposes of this discussion, "forward" rotation is clockwise rotation when viewed from the right side of vehicle 10, and "backward" rotation is counter-clockwise rotation when viewed from the right side of vehicle 10. Lever 82 is in turn pivotally coupled to link 83, which is perpendicular to both lever 82 and rod 81, and which is also coupled to speed input member 48. Link 83 is pivotally coupled to speed input member 48 at a point proximal to outer end 51 of a slot 47. Although not visible in FIG. 2, left side speed input member 48 has linkage that is equivalent to, but a mirror image of, the linkage coupling rod 81 to right side speed input member 48.

Figure 3:
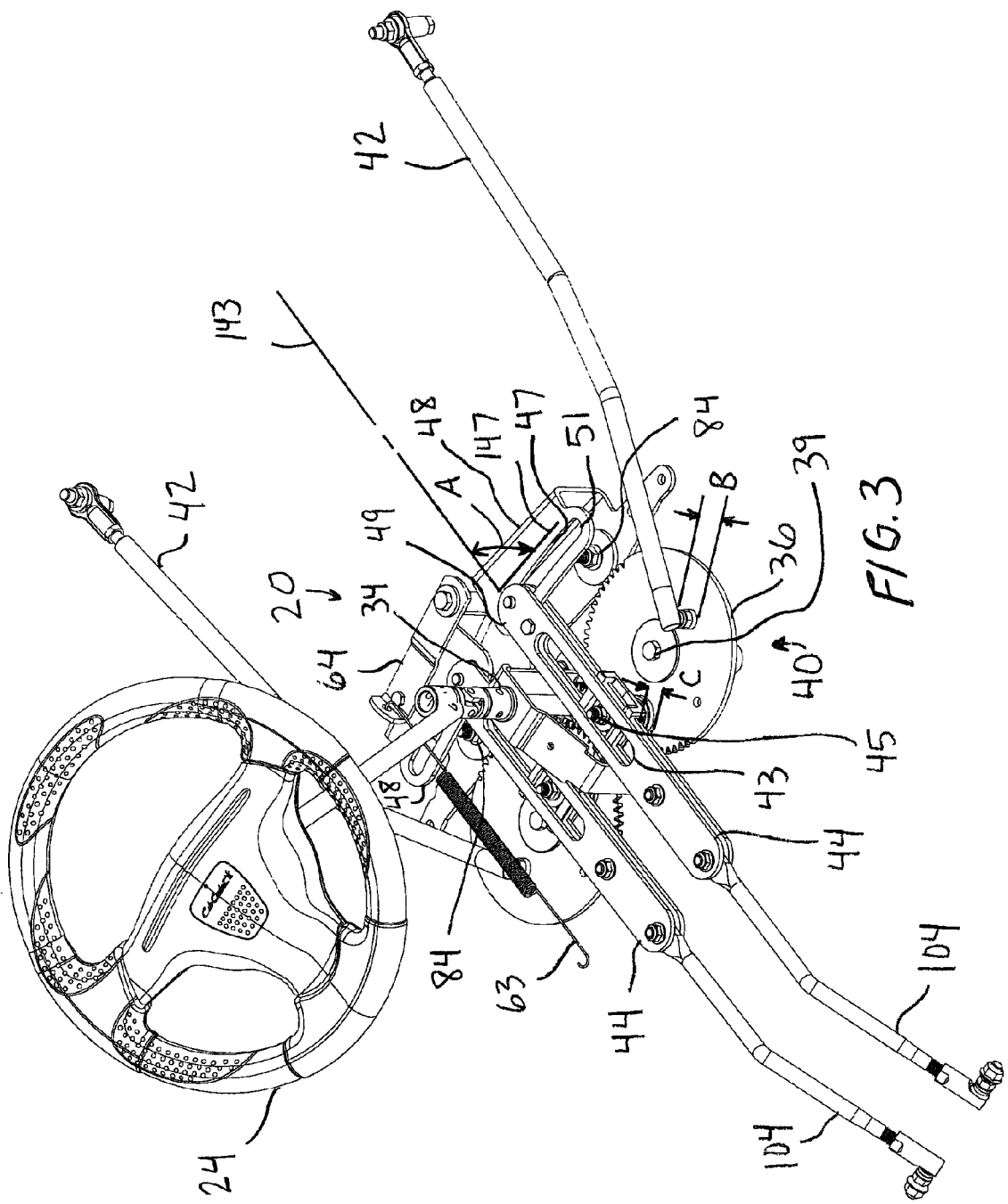
Figure 4:
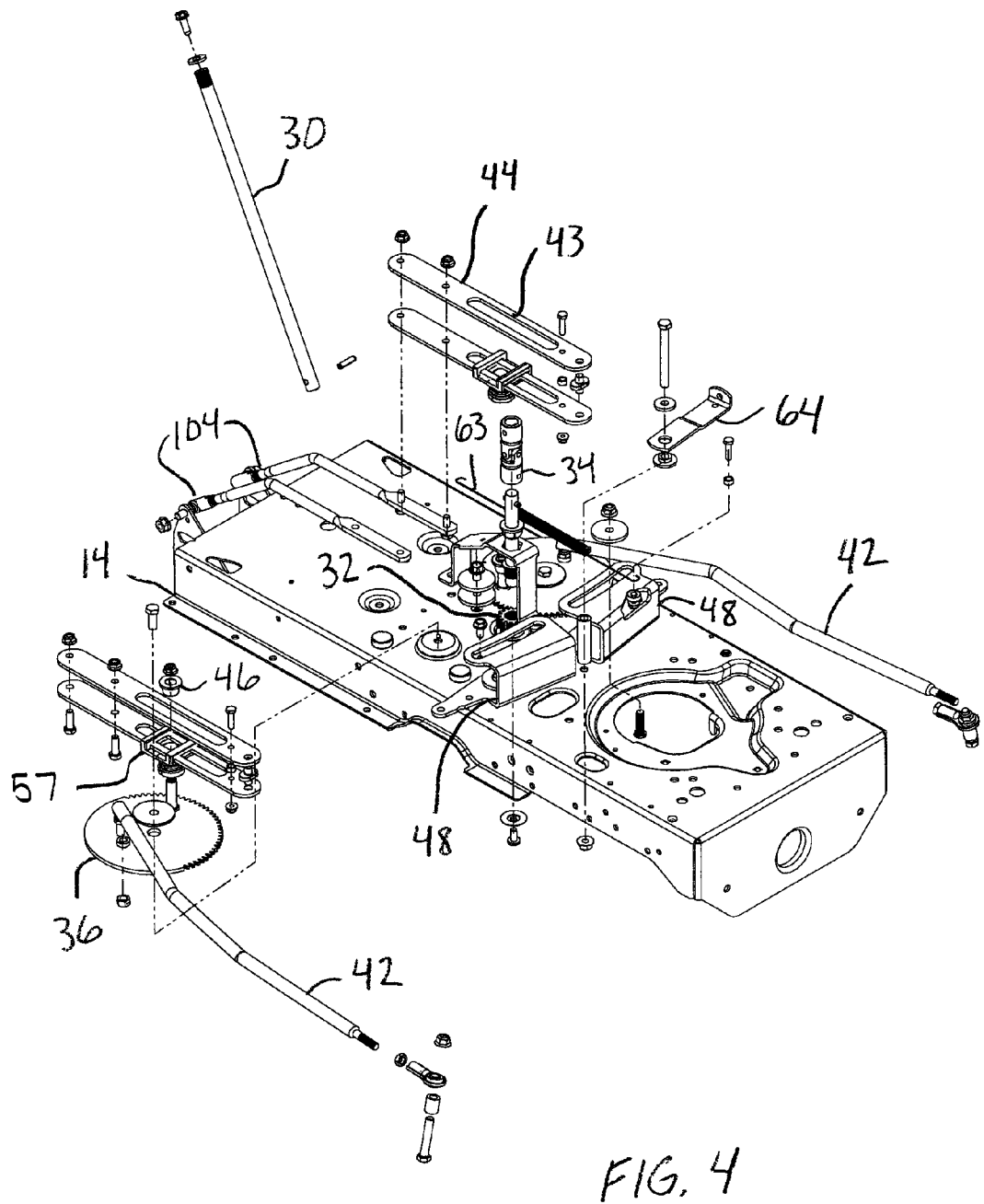

As shown in FIG. 3, slot 43 comprises a center axis 143 that forms an angle A with a line 147 that is tangential to the arc formed by slot 47. Line 147 is drawn to form a tangent with slot 47 at approximately the point where integration link 44 is coupled to slot 47. In the embodiment shown in FIG. 3, angle A is approximately 90 degrees when speed input member 48 is in the speed neutral position. As steering input device 24 is manipulated to provide a steering input, integration link 44 will be moved so that it is coupled to slot 47 at a different location than that shown in FIG. 3. As integration link 44 moves, the angle between center axis 143 and line 147 will not be changed if speed input member 48 is in the speed neutral position. However, if speed input member 48 is not in the speed neutral position, the angle between center axis 143 and line 147 will change as steering input device 24 is manipulated to provide a steering input. In exemplary embodiments, the angle between center axis 143 and line 147 will vary from between approximately 70 and 110 degrees. A biasing member 63 is coupled to a neutral lever 64 and biases speed input members 48 to the neutral position when a user does not provide a speed input.

As shown in FIGS. 2 and 3, right and left speed input members 48 each comprise a pivot member 84 that extends through the bottom portion of speed input member 48. As a result, when speed control device 28 is rotated forward, speed input members 48 will pivot or rotate about pivot member 84 so that an outer end 51 of slot 47 is also moved forward and inner end 49 is moved backward. Furthermore, as speed control device 28 is rotated backward, speed control assembly 21 will cause speed input member 48 to pivot so that outer end 51 is also moved backward and inner end 49 is moved forward.

As steering input device 24 is rotated to initiate a turn, steering shaft 30, steering input member 32, and control members 36 also rotate about pivot members 39. Pivot members 84 (for speed input members 48) and pivot members 39 (for control members 36) are oriented normal to a laterally-oriented plane that includes frame 14. As a result, speed input members 48 and control members 36 rotate about axes that are parallel to each other and normal to a flat surface on which a vehicle incorporating control system 40 is used. In the embodiment shown, integration links 44 are comprised of upper and lower halves (shown in the exploded view in FIG. 4) with slots 43. In certain embodiments, integration links 44 are coupled to control members 36 via coupling members 45 that engage the slots 43 in integration links 44 and holes (not visible) in control members 36. In certain embodiments, slots 43 are straight and allow coupling members 45 to move in a linear path. In some embodiments, coupling member 45 can directly couple integration link 44 to control member 36 by extending vertically through a portion of both integration link 44 and control member 36. Coupling members 45 may be bolts or pins with threaded ends that may be coupled to integration links 44 with nuts 46 and guide members 57. In other embodiments, coupling member 45 may be permanently attached to control member 36 (for example, through brazing or welding) and extend through slot 43 to directly couple control member 36 and integration link 44. In still other aspects, coupling member 45 may be integral to coupling member 36 and directly couple control member 36 to integration link 44 by extending through slot 43.

In the depicted embodiments, coupling members 45 are coupled to control members 36, so that as control members 36 rotate, coupling members 45 move in an arc, which movement includes both a forward or a backward component (towards the front or back of vehicle 10) and a lateral component (towards one side of vehicle 10). As a result, coupling members 45 can slide forward or back within slots 43 and can also cause integration links 44 to translate in a sideways manner by exerting a force on the side of slots 43.

Integration links 44 are also coupled to speed input members 48 via speed input coupling members 85. In one embodiment, speed input coupling members 85 are pins that extend vertically through integration links 44 and speed input members 48.

Figure 6:
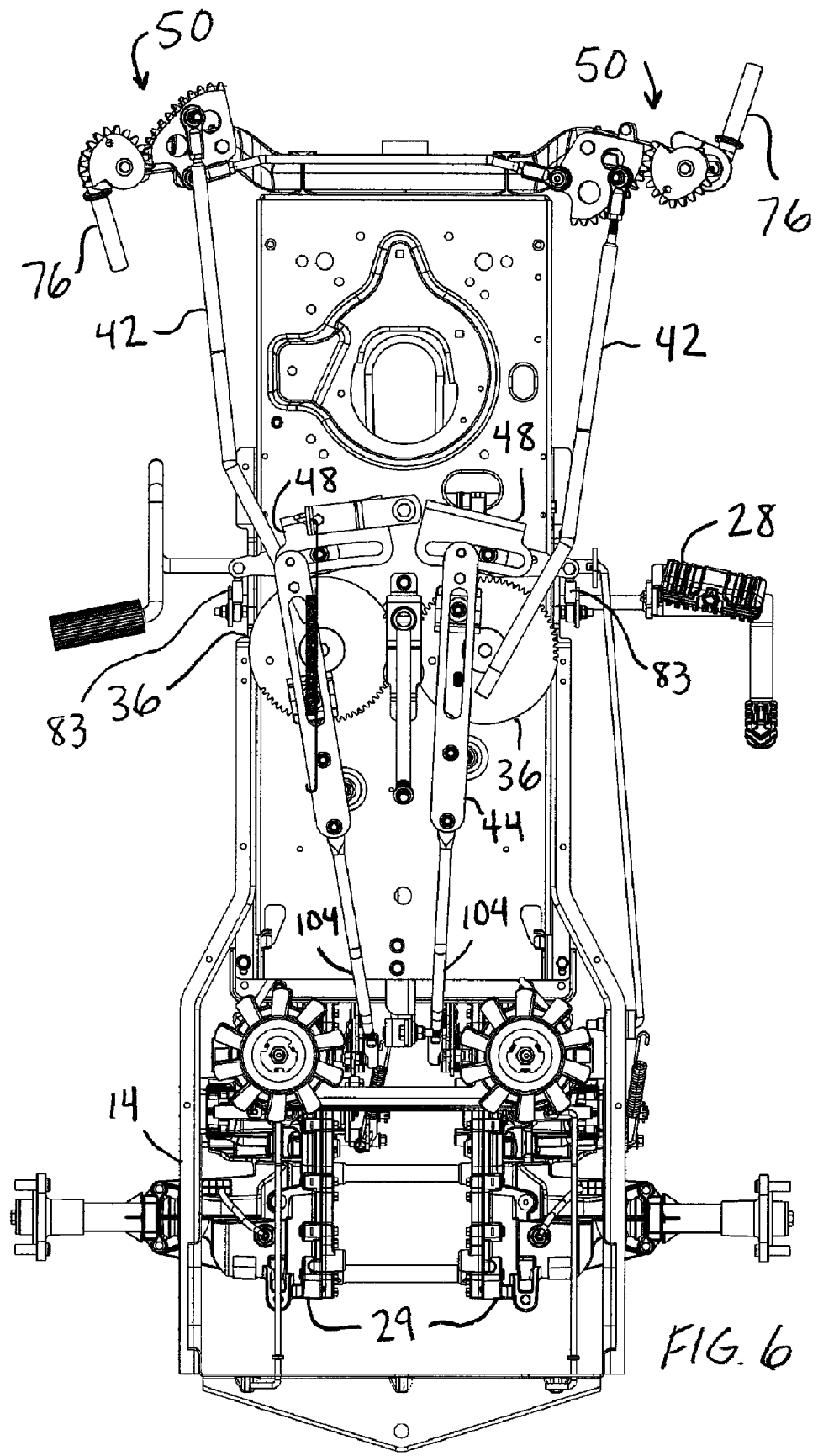

Coupling members 45 act on right and left integration links 44, which are translated so that they engage slots 47 of speed input members 48 in different locations within slots 47. For example, when steering input device 24 is placed in a neutral position as shown in FIG. 5, integration links 44 are arranged so that they are proximate to the inner ends 49 of slots 47. However, as steering input device 24 is turned to the left as shown in FIG. 6, left integration link 44 (and speed input coupling member 85) is moved proximate to outer end 51 of slot 47, while right integration link 44 is moved sideways toward outer end 51 to a lesser degree. Similarly, when steering input device 24 is turned to the right, as shown in FIG. 7, right integration link 44 is moved proximate to outer end 51 of slot 47, while left integration link 44 is moved sideways toward outer end 51 to a lesser degree.

As discussed more fully below, the manipulation of speed control device 28, along with steering input device 24, affects the rotational speed of drive wheels 16.

Control System

Figure 7:
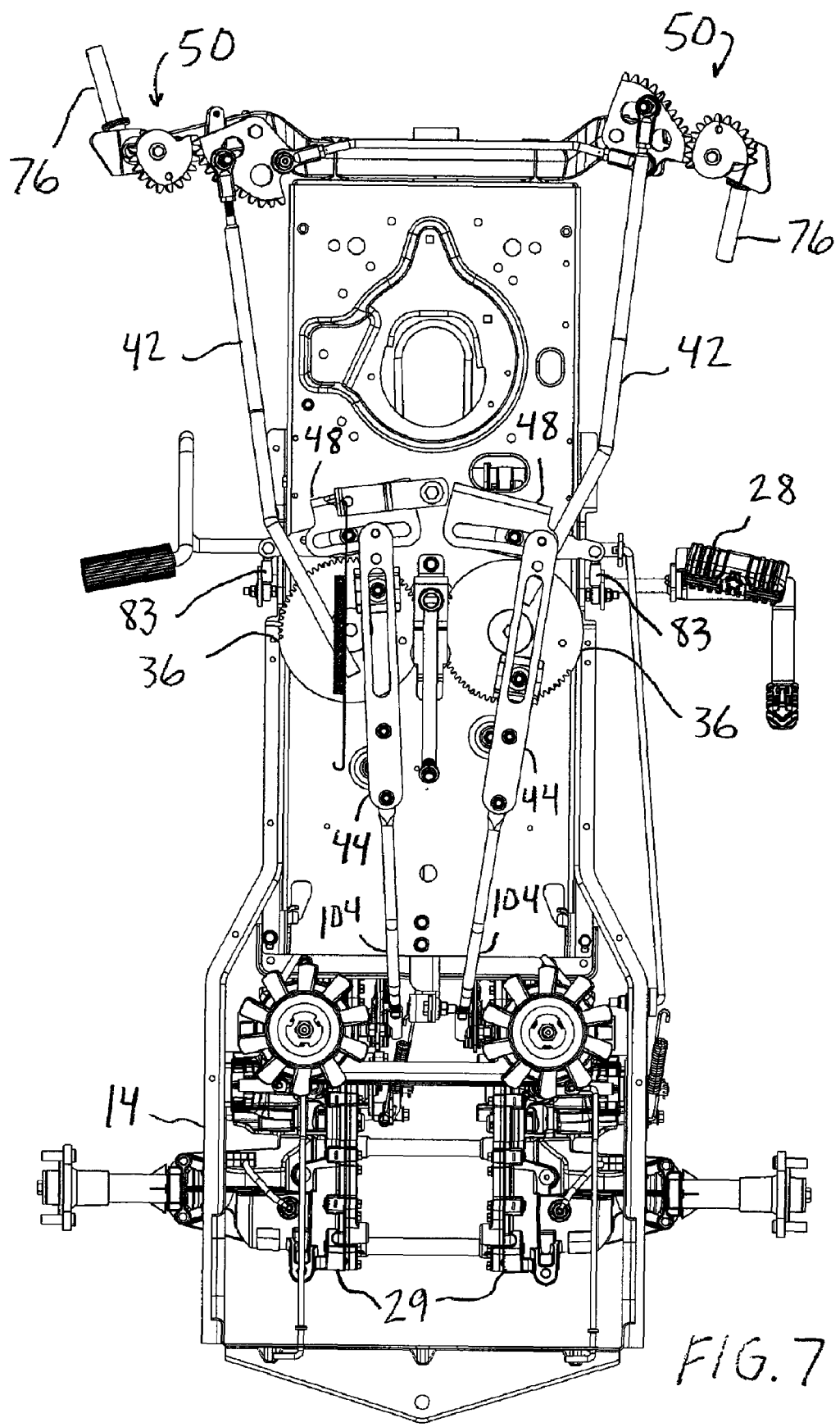

FIGS. 5-7 illustrate views of control system 40 in a neutral speed position for speed control device 28 and with different steering inputs from steering input device 24. With speed control device 28 in a neutral speed position, control system 40 is configured so that manipulation of steering input device 24 does not cause right or left integration link 44 to be shifted towards the front or rear of vehicle 10. For example, each slot 47 is slightly curved at a radius equivalent to the combined effective length of integration link 44 and drive rod 104 (i.e., the distance between slot 47 and the connection point where drive rod 104 connects to drive unit 29). Therefore, right and left drive units 29 will not be manipulated to cause rotation of either drive wheel 16 based on a steering input alone. The relationship between the position of integration links 44 and the output of drive units 29 is discussed more fully below.

Figure 14:
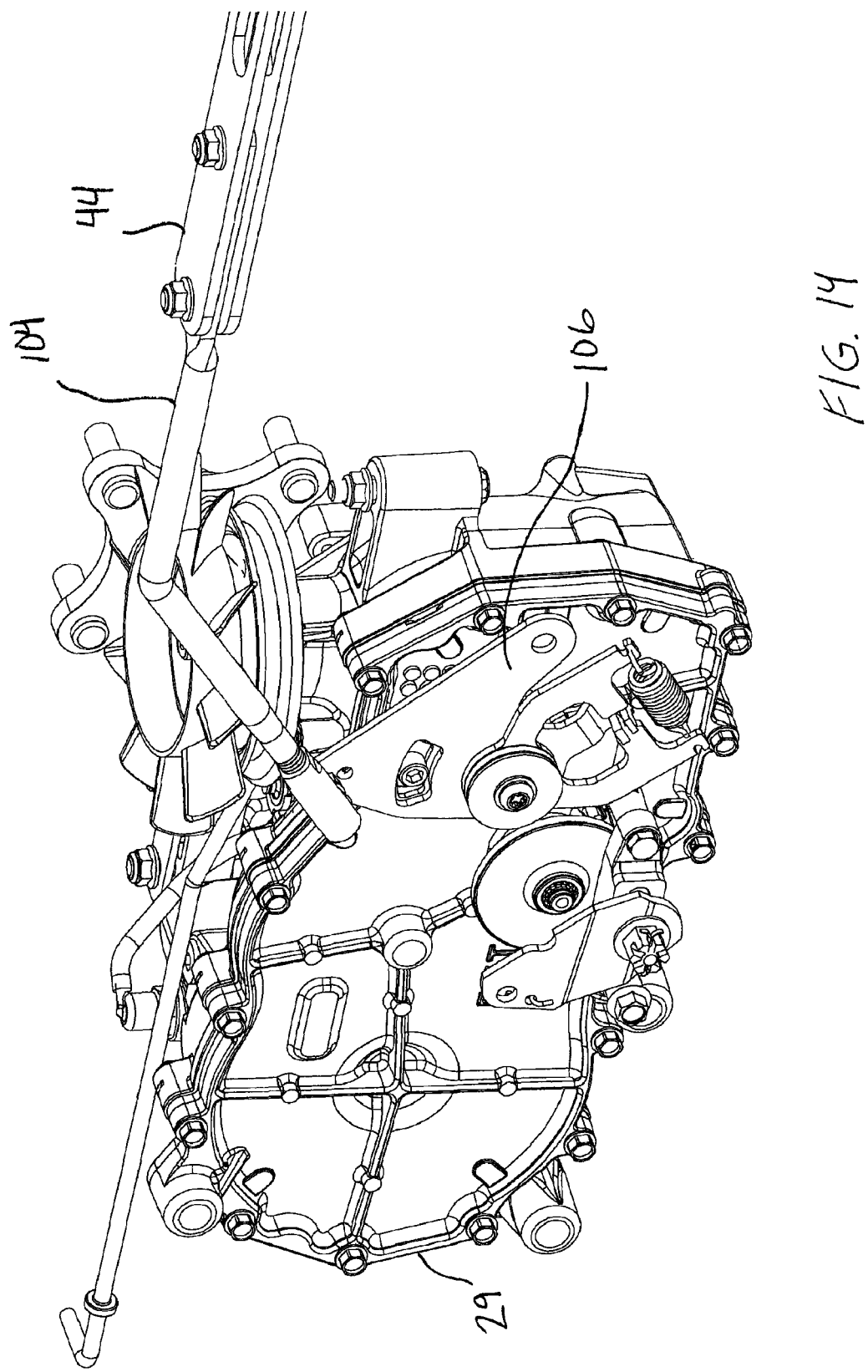

As shown in FIG. 14, integration link 44 is coupled to a drive rod 104, which is in turn coupled to a control mechanism 106 for drive unit 29. Integration link 44 and drive rod 104 may be integral components in certain exemplary embodiments. As explained more fully below, integration link 44 delivers an integrated steering and speed signal to drive unit 29 that controls the rotational speed and direction of the attached drive wheel 16. The integrated steering and speed signal is affected by the steering input from steering input device 24 and the speed input of speed control device 28.

Integration link 44 can be moved from a neutral position longitudinally toward drive unit 29 (i.e., toward the rear of vehicle 10). With such movement, control mechanism 106 is manipulated so that drive unit 29 rotates its corresponding drive wheel 16 in a forward direction. Conversely, if integration link 44 is moved away from drive unit 29 from a neutral position, control mechanism 106 is manipulated so that drive unit 29 rotates drive wheels 16 in a reverse direction. If integration link 44 is not moved from a neutral position longitudinally toward or away from drive unit 29, control mechanism 106 will not be manipulated. Consequently, drive unit 29 will not cause forward or reverse rotation of drive wheel 16. In other embodiments, drive rod 104 may be coupled to control mechanism 106 such that rearward movement of integration link 44 causes reverse, rather than forward, rotation of drive wheel 16 (and forward movement of integration link 44 may cause forward rotation of drive wheel 16).

Figure 8:
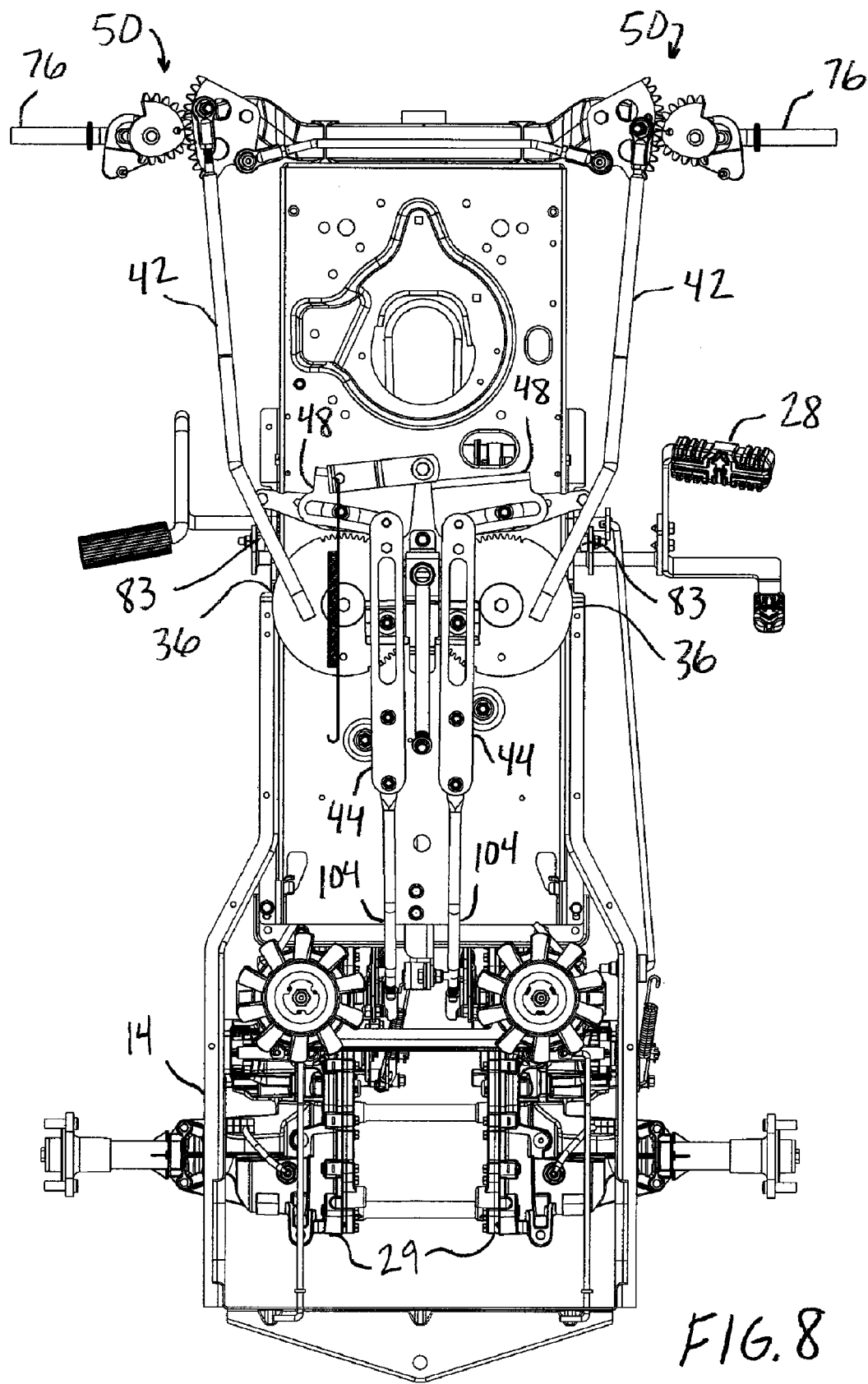
Figure 9:
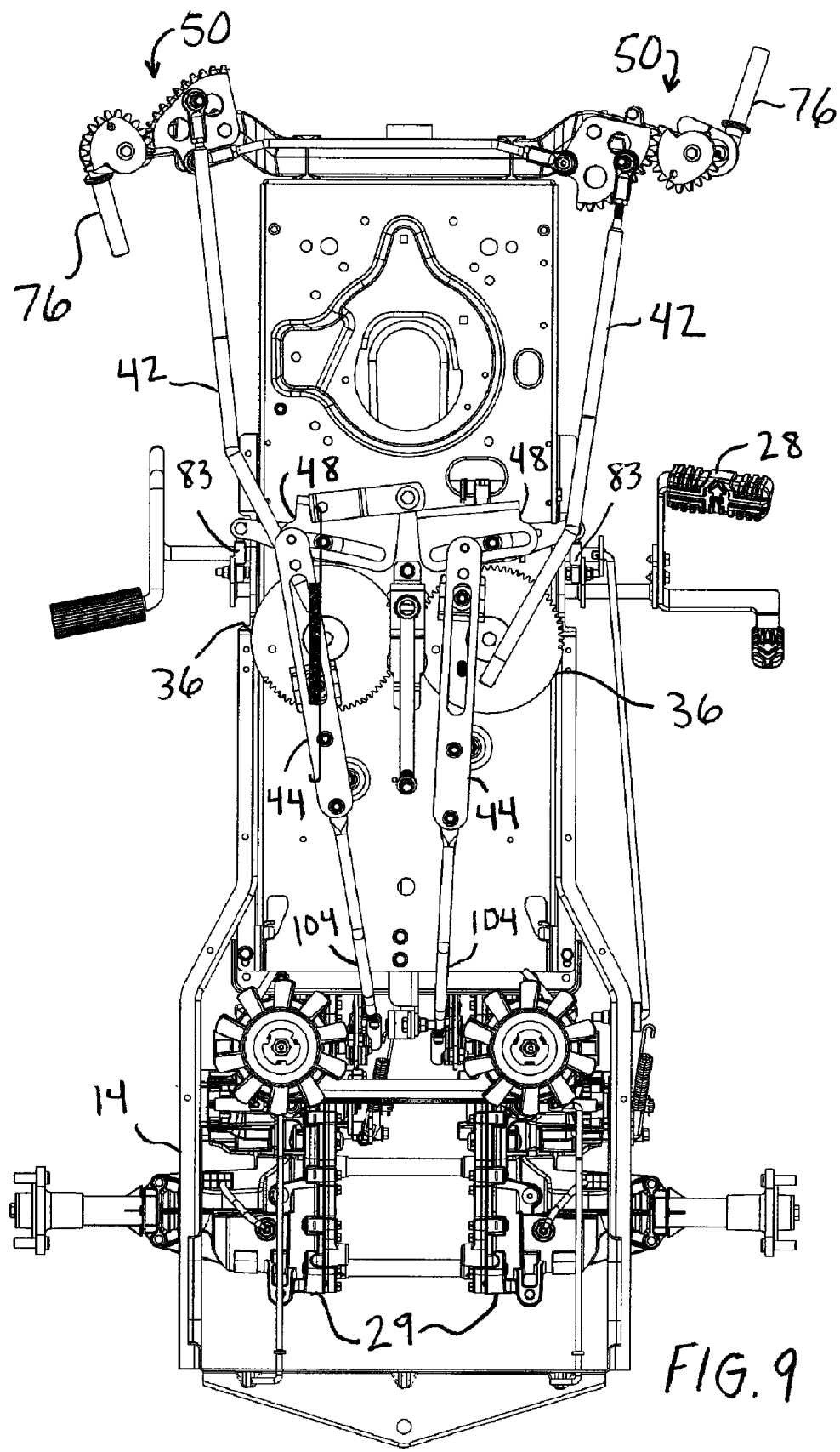
Figure 10:
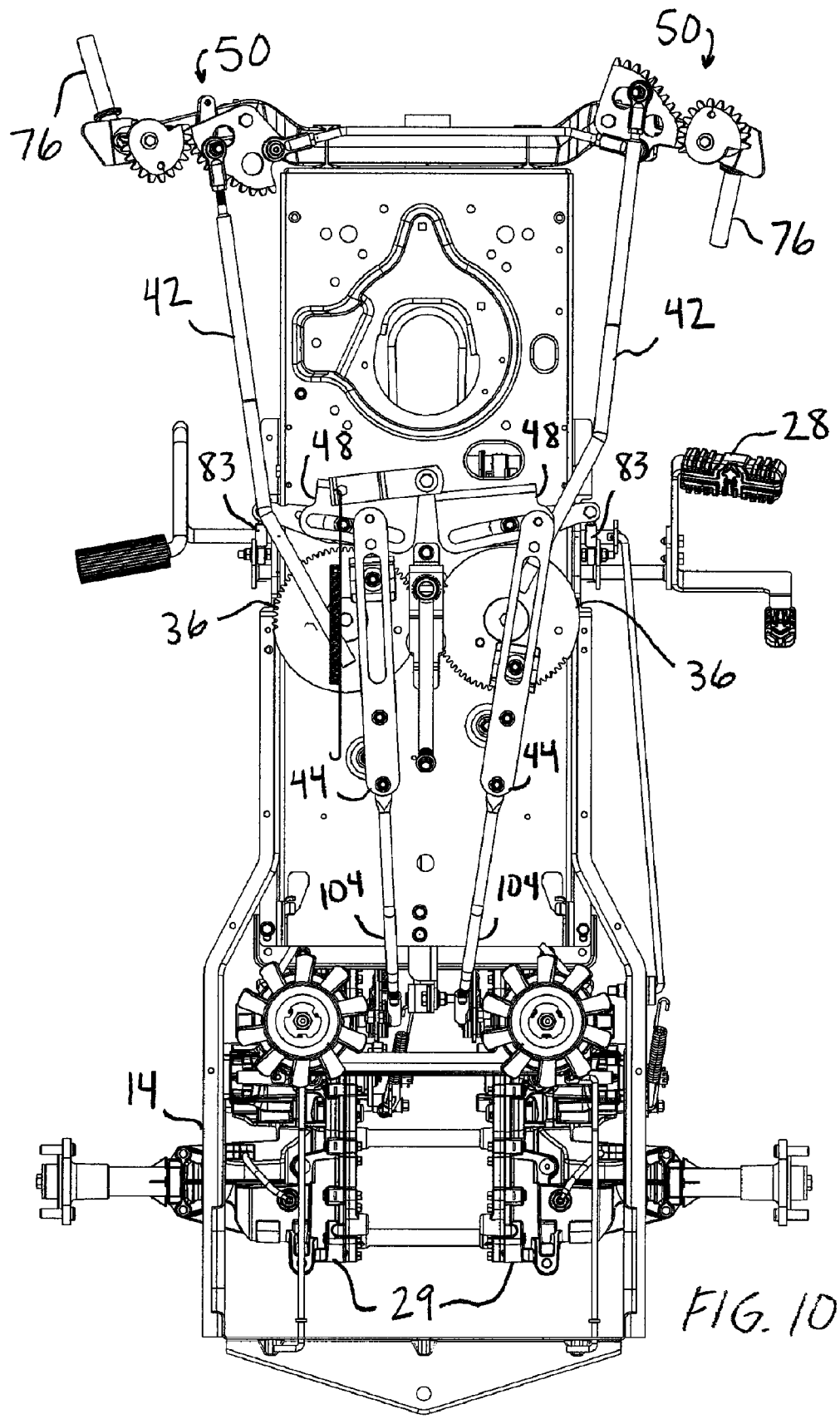

FIGS. 8, 9 and 10 illustrate views of control system 40 with a full forward speed input from speed control device 28 and neutral, left turn, and right turn steering inputs, respectively, from steering input device 24. As shown in the comparison of FIGS. 5 and 8, when speed control device 28 is provided with a forward speed input, outer ends 51 of slots 47 are moved towards the front end of vehicle 10, and inner ends 49 of slots 47 are moved towards the rear of vehicle 10.

As shown in FIG. 8, with neutral steering and full forward input from speed control device 28, both integration links 44 are pushed toward the rear of vehicle 10 an equal amount. With right and left integration links 44 moved from a speed-neutral position toward drive units 29, both drive units 29 will cause drive wheels 16 to rotate in a forward direction. As shown in FIG. 8, steering input device 24 is in a neutral position, therefore both front wheel assemblies 50 are positioned so that the front wheels 18 (not shown in FIG. 8) would direct vehicle 10 straight ahead. In FIG. 8, each integration link 44 is placed in an equivalent relative position within slot 47. Therefore, each integration link 44 is moved an equivalent amount towards the rear of vehicle 10 when speed control device 28 is manipulated. As a result, the drive units 29 are manipulated to rotate drive wheels 16 at equivalent rotational speeds. Drive wheels 16 will therefore work in conjunction with front wheels 18 to cause vehicle 10 to maintain a path straight ahead.

However, as steering input device 24 is manipulated to cause a right or left turn for vehicle 10, control system 40 causes right and left drive wheels 16 to rotate at different speeds. By rotating the right and left drive wheels 16 at different speeds, the drive wheels are able to assist vehicle 10 in turning. In particular, the outside drive wheel 16 (the drive wheel farthest from the center of the turning arc) can rotate at a faster rotational speed than the inside drive wheel. In sharp turns, the outside and inside drive wheels may also rotate in opposite directions. When the rotation of right and left drive wheels 16 is coordinated with the angle of front wheels 18, vehicle 10 can make small- or zero-radius turns and reduce the likelihood of a wheel skidding and damaging the turf or vegetation below vehicle 10.

Referring now to FIG. 9, speed control device 28 is placed in the full forward position, and steering input device 24 has been manipulated so that control system 40 and steering assembly 20 configure front wheel assemblies 50 for a left turn. Control system 40 is therefore configured for a full-forward speed left turn in FIG. 9. Comparing FIG. 9 (full-forward speed left turn) to FIG. 6 (neutral speed input, left turn), right integration link 44 has been shifted rearward from the neutral position in FIG. 9. In addition, left integration link 44 has been shifted forward. As a result, right drive wheel 16 will rotate in a forward direction, while left drive wheel 16 will rotate in a reverse direction. This combined rotation of the drive wheels 16 in opposite directions will assist vehicle 10 in making a small- or zero-radius turn.

As shown in FIGS. 8 and 9, outer ends 51 (rather than inner ends 49) of slots 47 are closer to the front of vehicle 10. Therefore, as steering input device 24 is turned and integration links 44 are translated sideways, integration links 44 and drive rods 104 will also be moved forward towards the front of vehicle 10. Each control mechanism 106 will therefore also be rotated away from its respective drive unit 29, so that the forward rotational speed of each drive wheel 16 is reduced. The geometry of control system 40 is such that integration link 44 associated with inner drive wheel 16 will be shifted forward more than integration link 44 associated with outer drive wheel 16. Consequently, the forward rotational speed of inner drive wheel 16 will be reduced more than that of outer drive wheel 16. When steering input device 24 is provided with a sufficient amount of input, the inner drive wheel 16 will eventually cease forward rotation and begin reverse rotation. This combined rotation of the drive wheels 16 in opposite directions will assist vehicle 10 in making a small- or zero-radius left turn.

Referring now to FIG. 10, control system 40 is configured for a full-forward speed input and a full right turn. This configuration is equivalent to FIG. 9, with the exception that steering input device 24 (shown in FIG. 3) has been turned to the right instead of the left. In this configuration, right integration link 44 is positioned so that right drive unit 29 will provide a reverse rotation of inner (right) drive wheel 16. Vehicle 10 can therefore perform a small- or zero-radius turn to the right.

Figure 11:
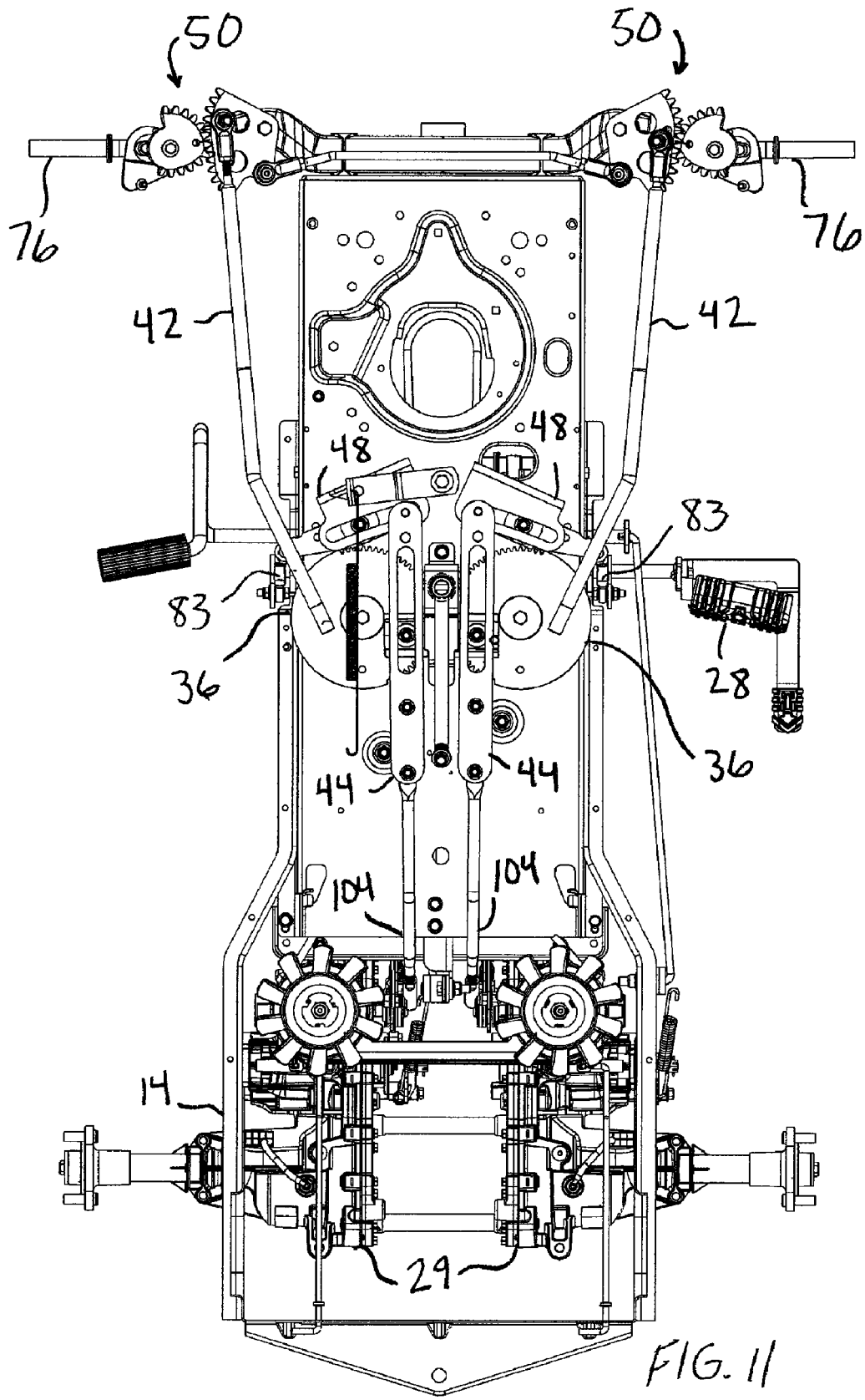
Figure 12:
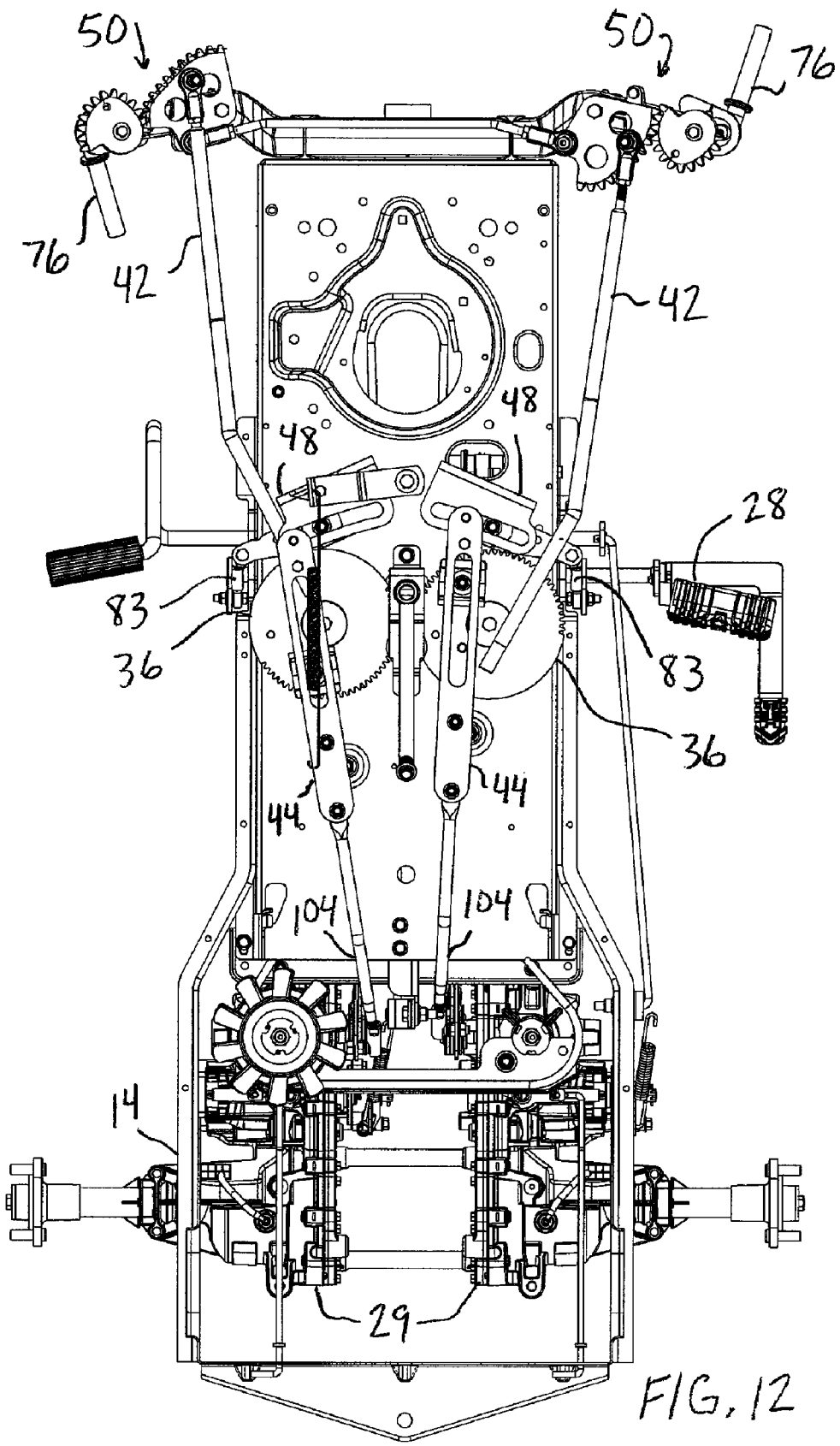
Figure 13:
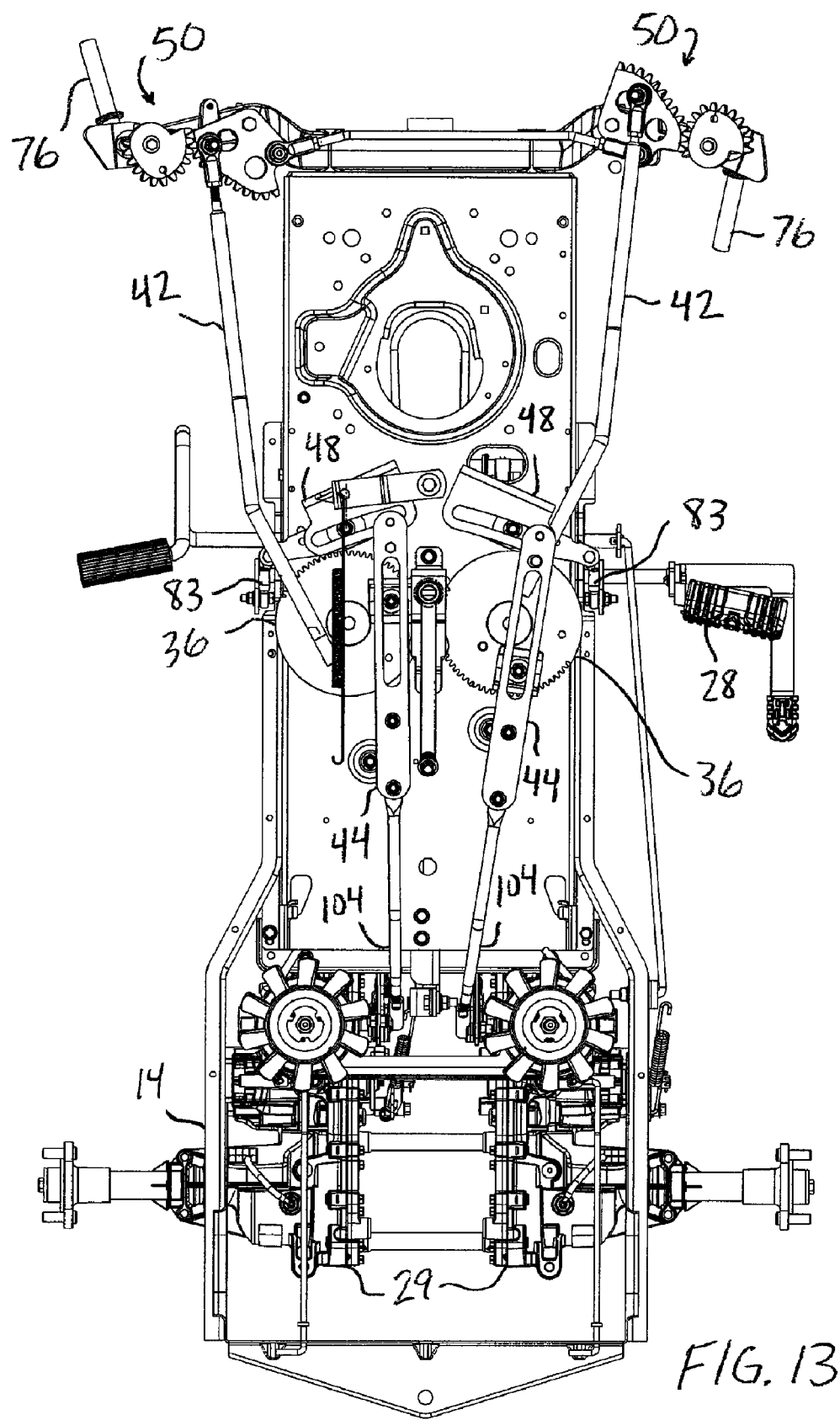

Referring now to FIGS. 11-13, speed input member 28 has been positioned to provide a reverse speed input to control system 40. In FIG. 11, control system 40 is configured for a neutral steering input. In FIGS. 12 and 13, control system 40 is configured for a left-turn and a right-turn, respectively. In FIGS. 11-13, speed input members are positioned so that inner ends 49 (rather than outer ends 51) are closer to the front of vehicle 10. Therefore, as integration links 44 move outward in response to a steering input, they will also move backward toward the rear of vehicle 10. As a result, control mechanism 106 will reduce the reverse rotational speed of each drive wheel 16. If a sufficient steering input is provided, integration link 44 associated with inside drive wheel 16 will be pushed far enough rearward to cause inside drive wheel to cease reverse rotation and begin forward rotation. Inside drive wheel 16 can therefore rotate forward and outside drive wheel 16 can rotate in reverse during a full turn with a reverse speed input.

In FIG. 12, control system 40 is positioned for a left turn and speed control device 28 is positioned for a reverse speed input. The left integration link 44 is pushed sufficiently rearward so that left (inside) drive wheel 16 will rotate forward. Right integration link 44 is placed sufficiently forward so that outer (right) drive wheel 16 will rotate in reverse. With this configuration, vehicle 10 can make a small or zero-radius reverse left turn.

Referring now to FIG. 13, control system 40 is positioned for a right turn with speed control device 28 providing a reverse speed input. The right integration link 44 is pushed sufficiently rearward so that right (inside) drive wheel 16 will rotate forward. Left integration link 44 is placed sufficiently forward so that outer (left) drive wheel 16 rotates in reverse. With this configuration, vehicle 10 can make a small- or zero-radius reverse right turn.

Descriptions of well known manufacturing and assembly techniques, components and equipment have been omitted so as not to unnecessarily obscure the present systems and devices in unnecessary detail. Further, the present systems and devices are not intended to be limited to the particular forms disclosed. Rather, they are to cover all modifications, equivalents, and alternatives falling within the scope of the claims.

For example, the control members may be configured differently than shown in the figures. In alternative embodiments, the control members may be segments of a circle rather than a complete circle. Furthermore, the drive rods and the integration links may be a single component rather than separate components. Moreover, the guide members for the integration links may engage the slots in the integration links rather than the outer portions of the integration links. In still other embodiments, the linkage coupling the speed control device to the speed input members may be a different configuration from that shown. For example, the linkage may be coupled to a single speed input member, which in turn provides an input to the other speed input member via a geared engagement at the ends of the speed input members.

The appended claims are not to be interpreted as including means-plus-function limitations, unless such a limitation is explicitly recited in a given claim using the phrase(s) "means for" and/or "step for," respectively.

The invention claimed is:

1. A vehicle control system comprising:
 a steering input member;
 a laterally oriented first control member operatively engaged with the steering input member such that movement of the steering input member causes movement of the first control member;
 a first steering link coupled to the first control member and to a steering system for a first steered wheel; and
 a first integration link coupled to the first control member and to a control system for a first drive unit, the first integration link being movable in response to a speed input.

2. The vehicle control system of claim 1, further comprising:
 a second control member operatively engaged with the steering input member;
 a second steering link coupled to the second control member and to a steering system for a second steered wheel; and
 a second integration link coupled to the second control member and to a control system for a second drive unit.

3. The vehicle control system of claim 2, where the first drive unit is a first hydrostatic transmission and the second drive unit is a second hydrostatic transmission.

4. The vehicle control system of claim 2, where the second control member is laterally oriented.

5. The vehicle control system of claim 2, where the first and second integration links each includes a slot.

6. The vehicle control system of claim 5, where the slot in the first second integration link is straight and the slot in the second integration link is straight.

7. A vehicle control system comprising:
 a steering input member;
 a first control member operatively engaged with the steering input member;
 a first steering link coupled to the first control member and to a steering system for a first steered wheel;
 a first integration link coupled to the first control member and to a control system for a first drive unit;
 a second control member operatively engaged with the steering input member;
 a second steering link coupled to the second control member and to a steering system for a second steered wheel;
 a second integration link coupled to the second control member and to a control system for a second drive unit;
 a first coupling member coupling the first integration link to the first control member; and
 a second coupling member coupling the second integration link to the second control member;
 where the first and second integration links each includes a straight slot, the first coupling member engages the slot of the first integration link, and the second coupling member engages the slot of the second integration link.

8. The vehicle control system of claim 7, where the first integration link is directly coupled to the first control member via the first coupling member and the second integration link is directly coupled to the second control member via the second coupling member.

9. The vehicle control system of claim 2, where the first and second control members are configured to rotate in the same plane in response to a rotation of the steering input member.

10. The vehicle control system of claim 2, where the steering input member is located between the first and second control members.

11. A vehicle control system comprising:
 a steering input member;
 a first control member operatively engaged with the steering input member;
 a first steering link coupled to the first control member and to a steering system for a first steered wheel;
 a first integration link coupled to the first control member and to a control system for a first drive unit;
 a first speed input member; and
 a first speed input coupling member that couples the first integration link to the first speed input member.

12. The vehicle control system of claim 11, where the speed input member includes a slot.

13. The vehicle control system of claim 12, where the first speed input coupling member translates across the slot as the steering input member rotates.

14. A vehicle control system comprising:
- a steering input member;
- a first control member operatively engaged with the steering input member;
- a first steering link coupled to the first control member and to a steering system for a first steered wheel;
- a first integration link coupled to the first control member and to a control system for a first drive unit; and
- a first speed input coupling member that couples the first integration link to the first speed input member.

15. A vehicle control system comprising:
- a steering input member;
- a first control member operatively engaged with the steering input member;
- a first steering link coupled to the first control member and to a steering system for a first steered wheel;
- a first speed input member coupled to a speed control device; and
- a first integration link coupling the first control member to the first speed input member, the first integration link also being coupled to a control mechanism for a first drive unit;
- the vehicle control system being configured such that a steering input received through the steering input member is transferred through the steering input member to the first control member, then through the first control member to the steering system and through the first integration link to the first speed input member, which can then transfer a speed input received from the speed control device through the first integration link and to the first drive unit as a driving and steering signal.

16. The vehicle control system of claim 15, further comprising:
- a second control member operatively engaged with the steering input member;
- a second steering link coupled to the second control member and to a steering system for a second steered wheel;
- a second speed input member coupled to the speed control device; and
- a second integration link coupling the second control member to the second speed input member, the second integration link also being coupled to a control mechanism for a second drive unit,
- the vehicle control system being configured such that a steering input received through the steering input member is transferred through the steering input member to the second control member, then through the second control member to the steering system for the second steered wheel and through the second integration link to the second speed input member, which can then transfer a speed input received from the speed control device through the second integration link and to the second drive unit as a driving and steering signal.

17. The vehicle control system of claim 16, wherein a manipulation of the steering input member while the speed control device is in a neutral position will not result in a change in the speed input.

18. The vehicle control system of claim 16, where the first drive unit is a first hydrostatic transmission and the second drive unit is a second hydrostatic transmission.

19. The vehicle control system of claim 16 where the first control member and the second control member are laterally oriented.

20. The vehicle control system of claim 16, where the first and second integration links each includes a slot.

21. The vehicle control system of claim 20, where the slot in the first second integration link is straight and the slot in the second integration link is straight.

22. The vehicle control system of claim 20, further comprising:
- a first coupling member coupling the first integration link to the first control member; and
- a second coupling member coupling the second integration link to the second control member;
- where the first coupling member engages the slot of the first integration link and the second coupling member engages the slot of the second integration link.

23. The vehicle control system of claim 22, where the first integration link is directly coupled to the first control member via the first coupling member and the second integration link is directly coupled to the second control member via the second coupling member.

24. The vehicle control system of claim 16, where the first and second control members are configured to rotate in the same plane in response to a rotation of the steering input member.

25. The vehicle control system of claim 16, where the steering input member is located between the first and second control members.

26. The vehicle control system of claim 16, where the first and second speed input members each include a slot.

27. The vehicle control system of claim 15, where the first speed input coupling member translates across the slot as the steering input member rotates.

28. A vehicle control system comprising:
- a pair of integration links, each integration link having a slot that is straight over substantially all of the length of the slot, and each integration link being movable in response to a speed input and configured to:
  - lie in a plane parallel to any flat surface on which a vehicle that incorporates the steering control system is used; and
  - transmit a drive signal that is a product of any received steering input and any received speed input.

29. The vehicle control system of claim 28, where one integration link is directly coupled to a first control member that is operatively engaged with a steering input member and the other integration link is directly coupled to a second control member that is operatively engaged with the steering input member.

30. A vehicle control system comprising:
- a first speed input member configured to pivot about a first axis;
- a second speed input member configured to pivot about a second axis;
- a first control member configured to pivot about a third axis;
- a second control member configured to pivot about a fourth axis, where the first, second, third and fourth axes are parallel to each other and are normal to any flat surface on which a vehicle that incorporates the steering control system is used; and a pair of integration links, each integration link having a slot that is straight over substantially all of the length of the slot, and each integration link being configured to:
  lie in a plane parallel to any flat surface on which a vehicle that incorporates the steering control system is used; and
  transmit a drive signal that is a product of any received steering input and any received speed input.

31. The vehicle control system of claim 30, where one integration link is directly coupled to the first control member and the other integration link is directly coupled to the second control member, both the first and second control members being operatively engaged with a steering input member.

* * * * *

UNITED STATES PATENT AND TRADEMARK OFFICE
CERTIFICATE OF CORRECTION

| | | |
|---|---|---|
| PATENT NO. | : 8,136,613 B2 | Page 1 of 1 |
| APPLICATION NO. | : 12/055668 | |
| DATED | : March 20, 2012 | |
| INVENTOR(S) | : Schaedler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this
Thirty-first Day of July, 2012

David J. Kappos
*Director of the United States Patent and Trademark Office*